Dec. 28, 1926.
A. V. SNODGRASS
TIRE SPREADER
Filed July 29, 1926
1,612,229
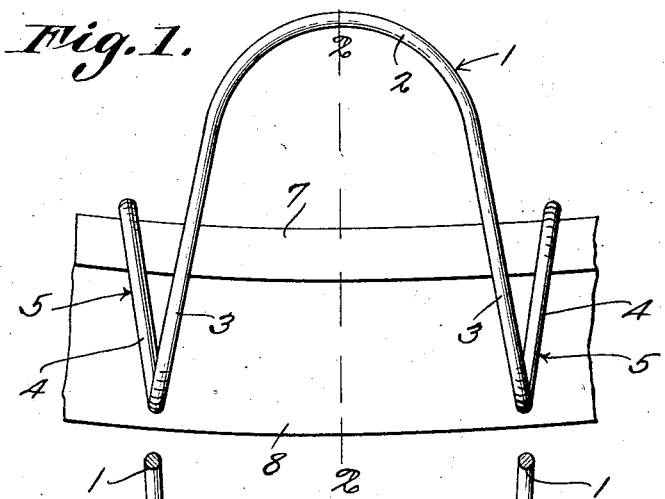
Fig. 1.
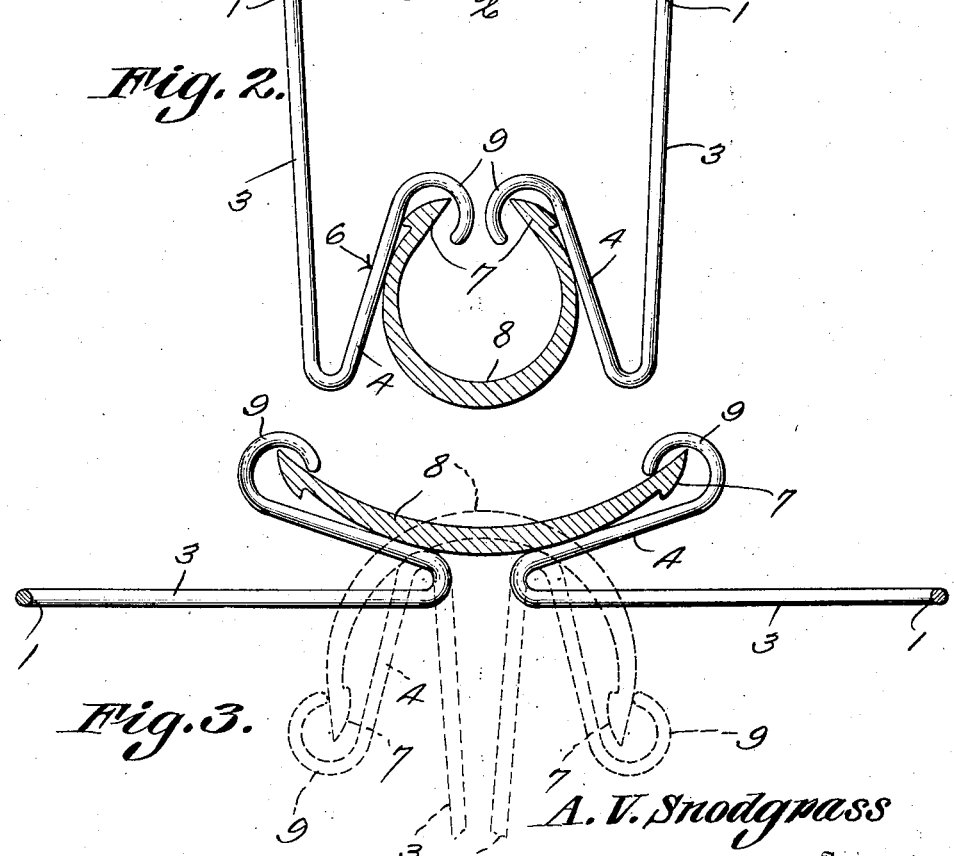
Fig. 2.
Fig. 3.
A. V. Snodgrass
Inventor,
By C. A. Snow & Co.
Attorneys.

UNITED STATES PATENT OFFICE.

ARTHUR V. SNODGRASS, OF LITTLE RIVER, KANSAS.

TIRE SPREADER.

Application filed July 29, 1926. Serial No. 125,754.

This invention aims to provide a means for opening a tire casing transversely, and for turning the tire casing inside out.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:—

Figure 1 shows in side elevation, a device constructed in accordance with the invention, applied to a tire casing;

Figure 2 is a section taken about on the line 2—2 of Figure 1;

Figure 3 is a section wherein the tire casing is shown as having been opened transversely.

The article forming the subject matter of this application is made of metal and includes an arched or U-shaped handle 1, comprising a bend 2 and diverging side arms 3, the side arms 3 being provided with fingers 4 disposed at an acute angle to the side arms 3. The fingers 4 diverge from each other, as shown at 5 in Figure 1, and they slant inwardly with respect to the side arms 3, as shown at 6 in Figure 2. The fingers 4 are supplied with means for engaging detachably, the edge 7 of a tire casing 8, said means preferably being in the form of hooks 9.

In practical operation, a pair of articles constructed as hereinbefore described, are mounted on a tire casing, as shown in Figure 2, the hooks 9 being engaged with the edges 7 of the tire casing, and the fingers 4 resting against the sides of the tire casing. When the handles 1 are swung toward a common plane, as shown in Figure 3, the tire casing 8 will be opened. If the handles 1 are swung until they approach approximate parallelism, the tire casing 8 will be turned inside out, as shown in dash line in Figure 3. Because the fingers 4 diverge, as shown at 5, the hooks 9 are permitted to engage the edges 7 of the casing 8 at widely spaced points.

What is claimed is:—

1. A tool of the class described comprising a U-shaped handle including side arms provided with reversely extended fingers, the fingers being equipped at their ends with means for engaging the edges of a tire casing detachably.

2. A tool of the class described comprising a U-shaped handle including diverging side arms merging into reversely extended diverging fingers, the fingers being equipped at their ends with means for engaging the edge of a tire casing detachably.

In testimony that I claim the foregoing as my own, I have hereto affixed my signature.

ARTHUR V. SNODGRASS.